Figure 1:
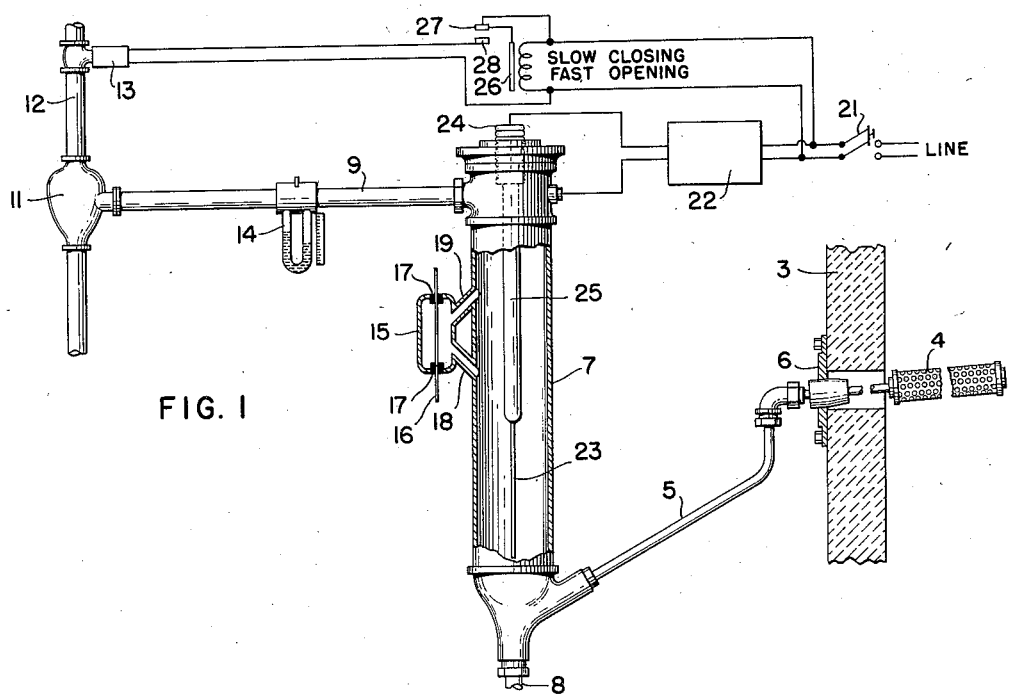

June 12, 1951     J. P. VOLLRATH     2,556,832
GAS ANALYZING APPARATUS
Filed March 12, 1947

INVENTOR.
JOSEPH P. VOLLRATH
BY Arthur H. Swanson
ATTORNEY.

Patented June 12, 1951

2,556,832

UNITED STATES PATENT OFFICE 2,556,832

GAS ANALYZING APPARATUS

Joseph P. Vollrath, North Wales, Pa., assignor, by mesne assignments, to Minneapolis-Honeywell Regulator Company, Minneapolis, Minn., a corporation of Delaware Application March 12, 1947, Serial No. 734,185

5 Claims. (Cl. 73—27)

The present invention relates to gas analysis apparatus, and more particularly to a system for cleaning a sample of gas to be analyzed prior to the time it is passed through a gas analyzing cell.

One of the most troublesome problems that is encountered in the operation of gas analyzing systems is that of cleaning the gas sample prior to the time it is passed into the gas analyzing cell. Even tiny particles of foreign matter that are entrained with the gas can cause a shift in calibration of the analyzing mechanism over a period of time.

In most gas analyzing systems it is customary to use a small flow gauge in the sample line to indicate if sufficient gas is flowing through the apparatus. If for some reason the pump, or other suction creating means, which draws the sample through the apparatus should fail it is not uncommon that a reverse flow of gas through the apparatus will occur. In such a case the liquid in the flow gauge is liable to be pulled back in the analyzing apparatus and contaminate the same. The apparatus will then be inoperative until it has been thoroughly cleaned.

It is an object of the present invention to provide a system that will insure a steady supply of clean gas to the analyzing apparatus. It is a further object of the invention to make sure that the sample of gas will not be supplied to the analyzing apparatus until the filter through which it is passing is in operating condition.

It is a further object of the invention to provide mechanism which will prevent a reverse flow of gas through the gas analyzing apparatus. It is a further object of the invention to provide a means responsive to the operation of a device which pulls the sample of gas through the analyzing apparatus which will prevent a reverse flow of gas through the apparatus upon the failure of said device.

It is also an object of the invention to provide coordinated means to control the flow of a sample of gas to be analyzed through an analyzing apparatus in such a manner that the gas sample will not be passed into the analyzing apparatus until the filter used to clean the gas sample is in working condition, and means to prevent a reverse flow of gas through the analyzing apparatus upon failure of the device which is drawing the gas therethrough.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 2:
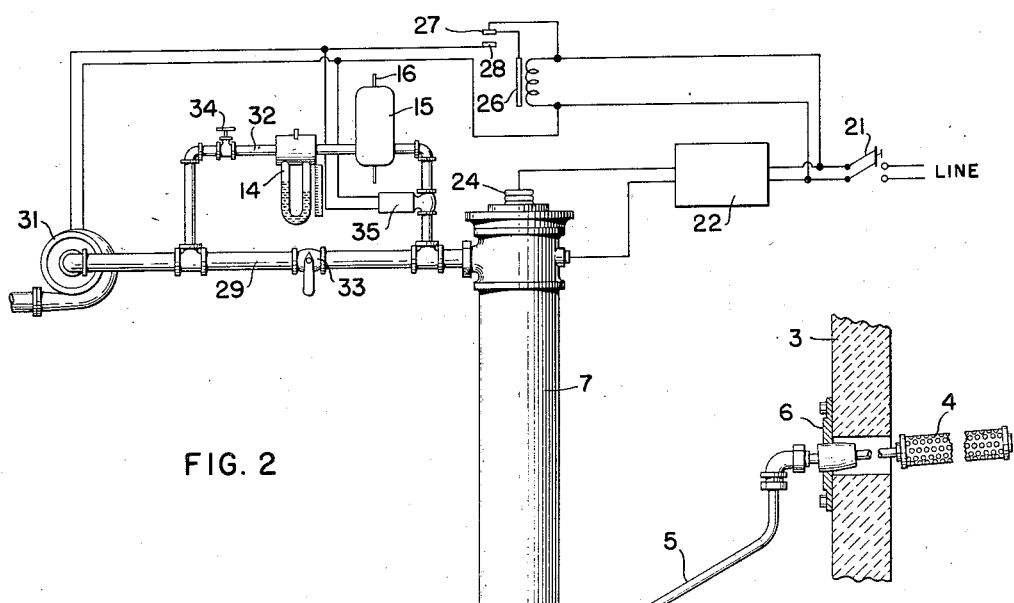

In the drawings:

Figure 1 shows a view partly in section of one system embodying the invention, and Figure 2 shows a view of a slightly different system embodying the invention.

Referring to Figure 1 of the drawing there is shown at 3 the wall of a furnace or other space whose atmosphere is to be analyzed. A sample of gas is drawn from this space through a primary filter 4 to a sample line 5. The filter is held in position in the wall of the furnace by a suitable support 6. The sample of gas passing through line 5 enters the lower portion of an electrical filter or precipitator 7 which has at its lower end an outlet 8 that is bent as shown in Figure 2 to form a seal or trap. The upper end of the precipitator has an outlet pipe 9 which is connected with an aspirator 11 of suitable capacity. This aspirator is supplied with water through a pipe 12 that has a normally closed solenoid valve 13 in it. In operation the aspirator pulls gas from the furnace or other space through the filter 4 and line 5 to the precipitator 7. From there it passes through the exhaust pipe 9 to the aspirator 11 where it is exhausted to the atmosphere or returned to the space, whichever is desired. A suitable flow gauge 14 is usually placed in the exhaust line to indicate the volume of gas which is being drawn through the system.

There is diagrammatically shown an analyzing cell 15 of any suitable type of gas analyzing system such, for example, as a thermal conductivity system of the type disclosed in Harrison Patent 1,818,619. Such a cell includes resistance wire 16 that passes through the cell and is heated in the usual manner. The resistance of this wire as affected by the composition of the gas is a measure of one of the constituents thereof. This wire is shown as being insulated from the cell itself by suitable insulators 17. As shown herein the cell is supported by the precipitator and is connected therewith by an inlet pipe 18 and an outlet pipe 19 which slope in the general direction of the gas flow. By having the connections slope as indicated instead of having them at right angles to the cell and the precipitator, as is conventional, there is less friction in the flow of gas in the cell thereby producing a larger flow and a better analysis. It is noted that the heat produced by the wire 16 will have a tendency to help this circulation of gas through the cell.

Power is supplied to the filter or precipitator 7 from a source of electric power through a switch 21, which supplies the power to a transformer and rectifier that are indicated at 22. One of the terminals from the rectifier is connected electrically to the shell of the precipitator while the other is connected to an electrode 23 and is insulated from the cell by a suitable insulator 24. It is noted that the electrode 23 is only exposed in the lower portion of the precipitator and is protected in the upper portion by an insulating support 25. This insures that the entire filtering action of the precipitator will take place in a region well below the entrance to the cell 15 which is located adjacent the upper portion of the precipitator.

In the operation of an electrical precipitator, as in other types of electronic device, a certain period is required for the apparatus to warm up before it begins to operate. In order to prevent drawing gas from the furnace or other space during the time that the precipitator is warming up a means is provided to delay action of the pump during the warming up period. For this reason there is provided in parallel with the apparatus 22 a relay 26 which is slow closing and fast opening. This relay has a closing time which is equal to or slightly larger than the warming up period of the precipitator. Therefore, when switch 21 is closed to supply power to the precipitator the aspirator will not be started until the former has warmed up and is in an active condition. After this time period is finished relay 26 will close contacts 27 and 28 to open solenoid valve 13 and permit water to flow through the aspirator so that it can start pulling gas through the system. Consequently unfiltered gas cannot be drawn through the analyzing cell with the resultant contamination and disturbance of calibration of the same.

The system shown in Figure 2 of the drawing operates in substantially the same manner as that of Figure 1. As shown in Figure 2 gas is drawn from the furnace or other enclosure through a primary filter 4 and a supply line 5 to the electrical filter or precipitator 7. From the precipitator gas flows through an exhaust line 29 to a pump 31. As shown in this embodiment of the invention the analyzing cell 15 is mounted in a by-pass line 32 around a suitable shut-off valve 33 which is located in the exhaust line. There is also provided a flow gauge 14 in the by-pass line to indicate the flow of gas through the analyzing cell, this flow to be regulated by means of a suitable throttling valve 34 which is placed in the line.

At times in the operation of a system of this type the pump 31 or the aspirator, if an aspirator is used in place thereof, may stop for some reason such as failure of power. When this occurs, there is frequently a reverse flow of gas through the system produced, for example, by the force of the draft in a furnace. When this occurs, the liquid in the flow gauge may be drawn into the analyzing cell 15 and in such a case will upset the calibration of the cell. The system will then have to be closed down until the cell can be cleaned out. In order to prevent a reverse flow of gas through the by-pass line in which the analyzing cell is located, there is provided in this line a normally closed solenoid valve 35.

In the operation of this system power is supplied to the precipitator 7 by the closure of switch 21. After the warming up period required to render the precipitator active, relay 26 will operate to close contacts 27 and 28. Closure of these contacts will supply power to solenoid valve 35 and the pump. The system is then in condition to operate and will continue as long as the power is supplied through switch 21. When switch 21 is opened relay 26 will close quickly to deenergize the pump and the solenoid valve. This will cause the pump to stop functioning immediately so that no more gas will be drawn through the system and it will also cause solenoid valve 35 to be closed to prevent the flow of gas in either direction through by-pass 32 in which the analyzing cell 15 is located.

From the above description it will be seen that I have provided a control system for a gas analyzing system using an electrical precipitator. This system is so constructed and operated that unfiltered gas cannot be drawn through the analyzing cell since the device for pulling the gas through the cell is not rendered operative until after the precipitator is in an active condition. It will also be seen that I have provided a means for preventing a reverse flow of gas through the analyzing cell and thereby prevented one common source of contamination of this cell since the liquid from the flow of gas cannot pass into it upon failure of the pump.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In a gas analyzing device, the combination of means forming a path through which gas to be analyzed passes including an electrical filter requiring a predetermined time after power is applied thereto to become active, analyzing apparatus, power-operated mechanism to draw gas to be analyzed through said filter and apparatus and a normally closed valve located between said filter and apparatus, means to apply power to said filter, to said mechanism to start its operation and to said valve to open it, and slow-closing, fast-opening, power-controlling means to delay the application of power to said mechanism and valve until after said predetermined time has elapsed whereby unfiltered gas cannot pass to said apparatus.

2. The combination of claim 1 wherein said means to delay includes a slow closing, fast opening relay whereby upon failure of the power said valve will close promptly to prevent a reverse flow of gas through said apparatus.

3. In a gas analyzing device, the combination of an electrical filter through which gas to be analyzed passes, said filter requiring a predetermined time after power is applied thereto to become active, gas analyzing apparatus connected to said filter, normally closed means located adjacent said apparatus and through which the gas passes, a slow closing, fast opening relay to apply power to said normally closed means to open the same when power is applied thereto, and means to apply power simultaneously to said filter and said relay.

4. In a gas analyzing apparatus, means to create a continuous sample flow of gas to be analyzed including an electrically-controlled flow-impelling device and a gas analyzing cell of the thermal-conductivity type, means to clean and remove moisture from the gas including an electrically-operated precipitator having a casing defining a precipitating chamber, the walls of said casing providing an extended surface electrode structure, complementary discharge electrode means positioned in said precipitating chamber, means for impressing an electric potential across said electrodes, a conduit connecting said cell and said precipitating chamber to said flow-impelling device so that a continuous sample of gas to be analyzed flows therethrough when said flow-impelling device is operating, and means to prevent said flow-impelling device from being actuated before said precipitator is operative to remove particles from the gas, said last mentioned means including a slow-closing fast-opening electrically operated relay connected so as to be energized when said precipitator electrodes are energized and to connect said flow-impelling device to a source of electric potential after a sufficient time has elapsed to allow said precipitator to become operative.

5. Apparatus according to claim 4 including an electrically-operated valve in said conduit and connected under the control of said relay so that said valve is moved to open position when said flow-impelling device is operating and so that said valve is moved to closed position immediately upon a failure of electricity which causes said flow-impelling device to become inoperative whereby a back flow through said cell is prevented.

JOSEPH P. VOLLRATH.

REFERENCES CITED

The following references are of record in the file of this patent:

UNITED STATES PATENTS

| Number | Name | Date |
| --- | --- | --- |
| 1,773,963 | Deutsch | Aug. 26, 1930 |
| 1,779,569 | Thompson | Oct. 28, 1930 |
| 2,241,555 | Krogh et al. | May 13, 1941 |
| 2,307,602 | Penney et al. | Jan. 5, 1943 |
| 2,341,727 | Krogh | Feb. 15, 1944 |
| 2,484,202 | Wintermute | Oct. 11, 1949 |